Sept. 12, 1967
A. P. GIULIANO
3,340,794
COOKING DEVICE
Filed March 18, 1966
3 Sheets-Sheet 1
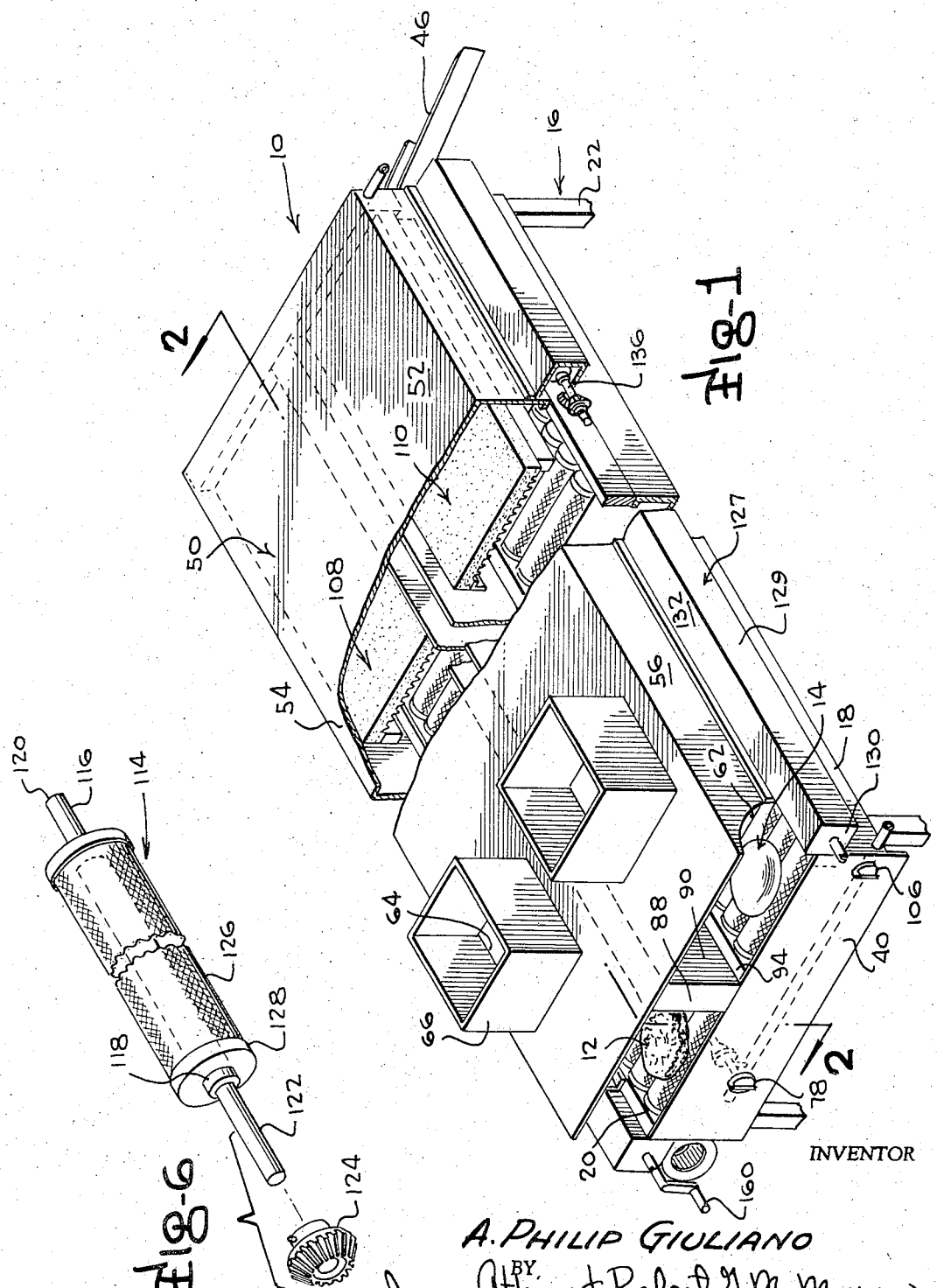
INVENTOR
A. PHILIP GIULIANO
BY James Atkins & Robert G. McMorrow
ATTORNEYS Sept. 12, 1967   A. P. GIULIANO   3,340,794
COOKING DEVICE
Filed March 18, 1966   3 Sheets-Sheet 3
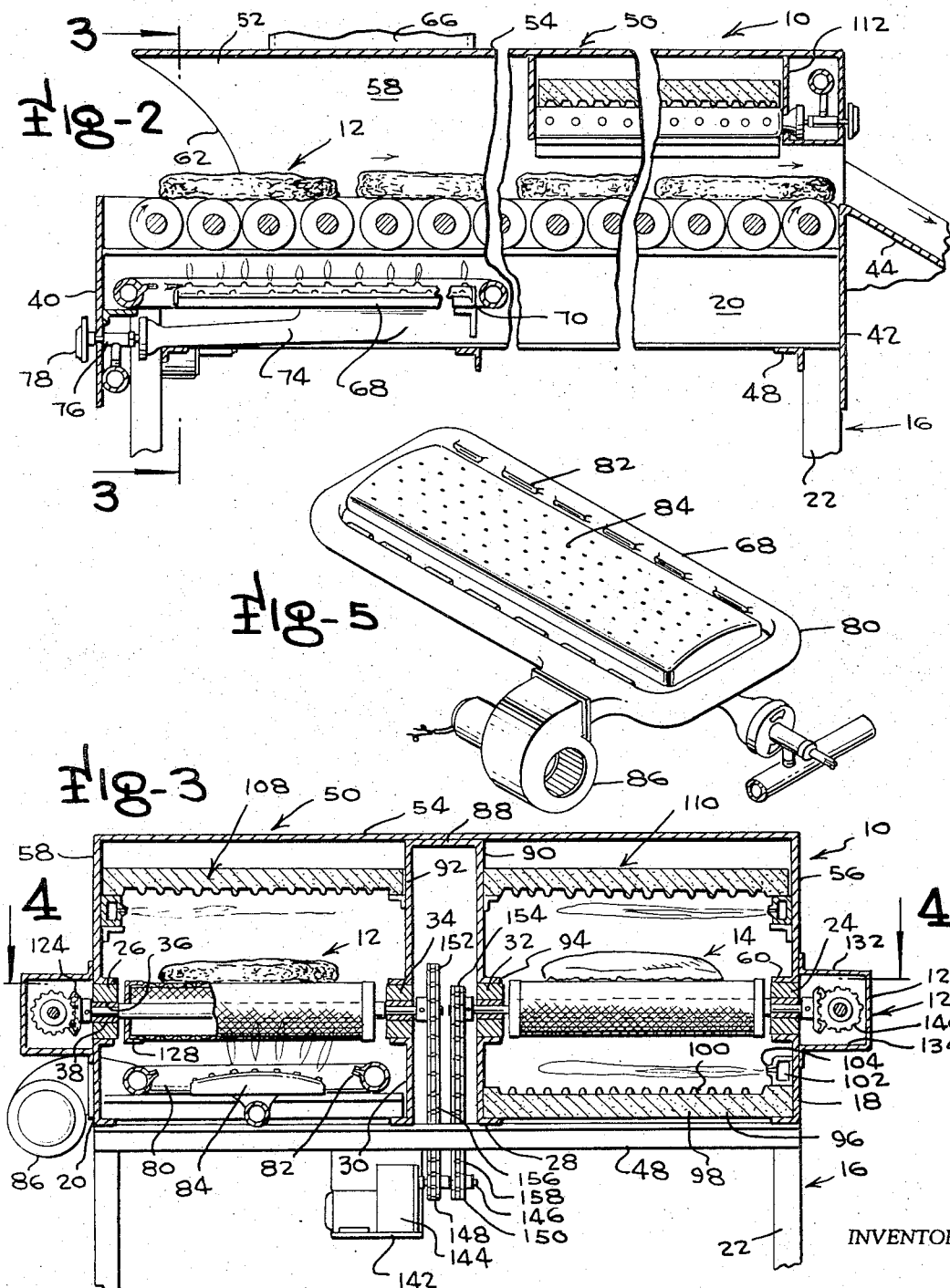
INVENTOR
A. PHILIP GIULIANO
BY
James Atkins & Robert D. McMorrow
ATTORNEYS

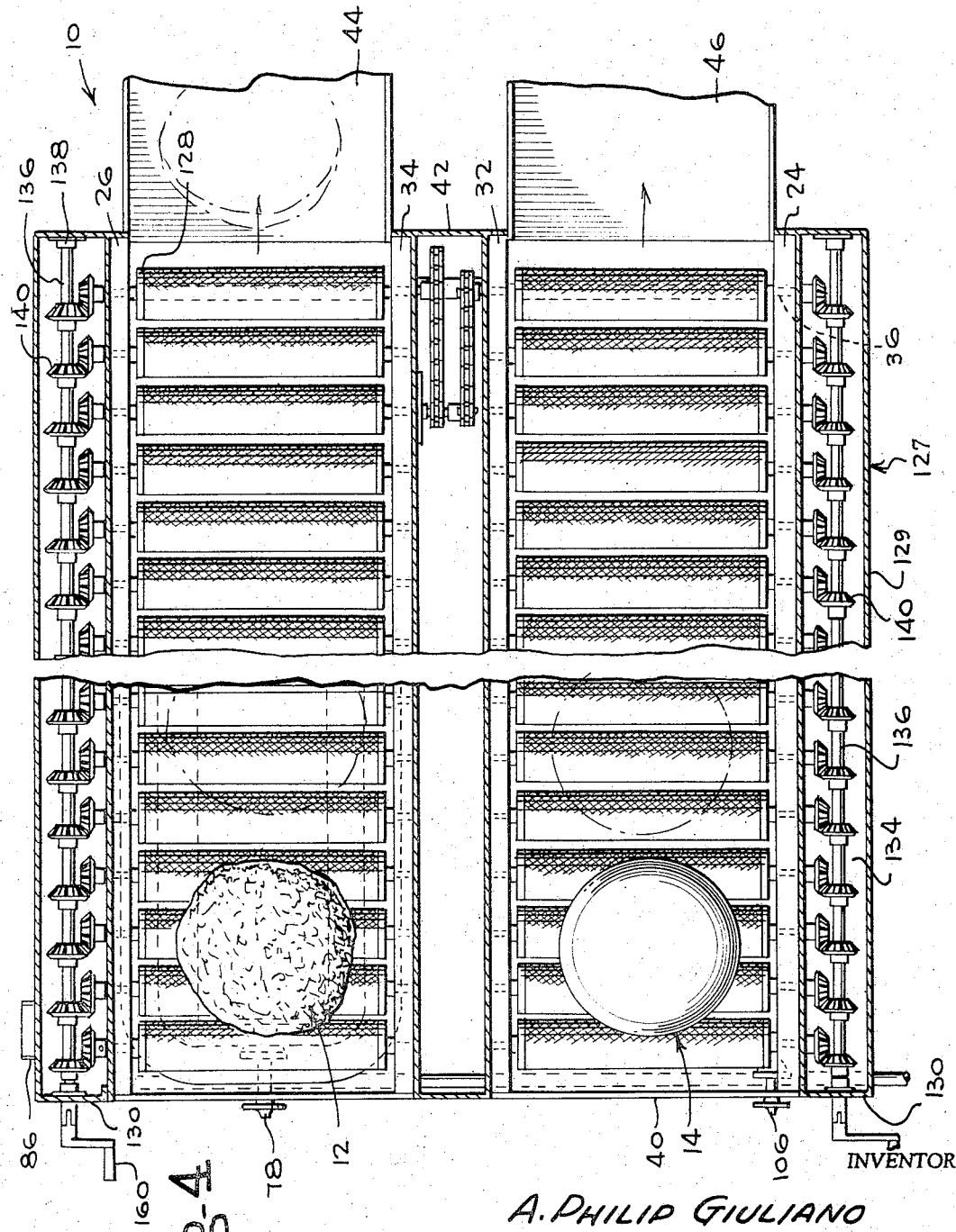

United States Patent Office 3,340,794
Patented Sept. 12, 1967

3,340,794
COOKING DEVICE
Anthony Philip Giuliano, 21 Jule Drive,
Delray Beach, Fla. 33444
Filed Mar. 18, 1966, Ser. No. 535,528
6 Claims. (Cl. 99—443)

ABSTRACT OF THE DISCLOSURE

A cooking device with a frame structure including top and bottom heat applying means and having plural, foraminous rollers rotatable about fixed axes and turning in the same direction of rotation.

This invention pertains to cooking apparatus, and more specifically, to new and novel means for the uniform, substantially automatic cooking of food substances and the like.

A basic objective of this invention resides in the provision of cooking apparatus of the type wherein the substance to be cooked is conveyed to the apparatus, the apparatus including means for imparting or applying heat to said substance in a uniform manner and effectively cooking the substance on both sides upon a single passage through the apparatus. Ancillary to this basic object is that of supplying a conveying carrier construction for use in cooking apparatus of the type described, the carriers being of perforate formation to permit the passage of heat therethrough.

Another objective of importance herein concerns providing a dual chamber cooking appliance with means for conveying the substance to be cooked through each chamber, and wherein each chamber includes overhead heat exchange means and heat exchange means arranged below the article to be cooked.

A still further object is to provide an appliance as aforesaid having exhaust means for the products of combustion located in juxtaposition with respect to the heat exchange means.

Yet another object is to provide a conveying system for a cooking appliance which includes a plurality of mesh conveying carriers of substantially cylindrical form, the carriers being suitably driven, and serving to transfer the substance to be cooked from one to another upon rotation thereof. A related advantage of the invention is that the sequential transfer of the substance to succeeding carriers in the system effectively positions a different area of the substance against the carrier at each transfer thereby insuring uniformity of heat application to the substance.

The invention comprehends the mounting of plural systems in a unitary apparatus whereby related food items may be prepared substantially simultaneously, as for example, a hamburger and its roll.

Other and further objects and advantages of the invention will become apparent to those skilled in the art from a consideration of the following specification when read in conjunction with the annexed drawings, in which:

FIGURE 1 is a perspective view, partially broken away and foreshortened for disclosure of details, of apparatus constructed and assembled in accordance with the teachings of this invention;

FIGURE 2 is an enlarged foreshortened sectional view taken substantially on the line 2—2 of FIGURE 1, looking in the direction of the arrows;

FIGURE 3 is a vertical cross sectional view along the line 3—3 of FIGURE 2, looking in the direction of the arrows;

FIGURE 4 is a further sectional view, showing the device as viewed from the line 4—4 of FIGURE 3, looking in the direction of the arrows;

FIGURE 5 is a perspective view of one heat exchange component hereof; and

FIGURE 6 is an enlarged, disassembled perspective view, foreshortened, of a conveying carrier hereof.

Proceeding to a more detailed description of the invention as shown in the drawings, a typical cooking apparatus hereof is generally designated therein by reference numeral 10. The appliance 10 is useful in the preparation and cooking of many items. For purposes of illustration herein, the device 10 is shown as employed in cooking comminuted meats in cake form 12, such as hamburgers, and might be employed in the simultaneous preparation of both the cake 12 and bread or roll 14 for use therewith. The illustration of items 12 and 14 is by way of example only, the device being usable in whatever instance it is desirable to apply heat to opposite sides of one or more articles in a uniform manner.

In FIGURE 1, it will be observed that the device 10 is composed of a supporting frame 16 of optional design. In this instance, the frame 16 includes a pair of oppositely mounted channel form side members 18, 20 and supporting legs 22. As shown in FIGURES 3 and 4, elongated substantial rectangular bearing blocks 24 and 26 are fixed to the side members 18 and 20, respectively. Intermediate channel members 28 and 30 also have bearing blocks 32, 34 thereon, and the blocks have mutually co-aligned openings 36 formed therein, arranged in pairs, and which may be fitted with suitable bearing sleeves 38. The frame 16 further includes a forward end plate 40 and rear end plate 42. As shown in FIGURES 2 and 4, the plate 42 has downwardly angled discharge chutes 44, 46 thereon arranged at spaced apart locations.

The side members 18, 20, 28 and 30, and end plates 40 and 42 are connected by suitable structural frame elements 48 to cumulatively form a bottom structure for the device. Above the blocks 24, 26 and 32, 34, the device is provided with a top structure 50. The structure 50 comprises an elongated generally rectangular hood 52 having a top 54 and sides 56, 58. The side lower end terminates in inturned flanges 60 seated upon the blocks 24 and 26. As shown in FIGURES 1 and 2, the sides are undercut beneath the top, as at 62, for ease of access to the forward end of the device. Adjacent said end, the top wall 54 has a pair of substantially rectangular openings 64 therein, and suitably vented ducts 66 are fixed about said openings for a purpose described below. An elongated burner 68 is secured at its forward end 70 to a transverse structural member 72 which in turn is connected between the side members 20 and 30 at one side of the device. A conduit 74 for combustion material (such as gas or the like) extends from the burner 68 through an opening 76 in the forward plate 40. A suitable gas flow control 78 of conventional type is mounted exteriorly of the device as shown in FIGURE 2. FIGURE 5 is illustrative of a burner 68 as aforesaid, and it will therein be observed that the burner has a peripheral air blower housing 80 thereabout. The housing 80 has outlets 82 at spaced locations arranged for air discharge in upwardly and inwardly angled fashion to direct flame from the burner body 84 in the direction indicated in FIGURE 3. An air movement device 86, such as a small centrifugal blower, is operatively connected to the air blower housing to force the air therethrough. The air movement device may be suitably secured to the frame 16 on an exterior side thereof for ease of access.

The top structure 50 has a longitudinal, dual division wall 88 therein, with sides 90 and 92. The sides have base flanges 94 secured on the blocks 32 and 34. The division wall separates the top structure into two cooking chambers, one of which at its forward area is subjected to the heat from the burner 68 forced upwardly therethrough by the device 86. The forward area of the other chamber is provided with a heating device 96 of less intensity. The device 96 comprises a block 98 of fire brick or similar material with heating grid elements 100 thereon. In FIGURE 3, it is seen that the block 98 is supported between the inturned base flanges of the channel form side members 18 and 28, and that an elongated burner 102 extends along one side thereof. The burner 102 has spaced apart openings 104 therein arranged to direct flame horizontally over the grids as shown, and a control 106 extends to a convenient position outwardly of the plate 40. Adjacent the opposite or rear end of the device additional burners 108 and 110 are disposed in each of the chambers. The burners 108, 110 are of a construction and operation substantially identical to that of the burner 96, and are mounted in overhead locations in brackets 112. The supporting framework of the device is preferably open below the last named burners to permit escape of the products of combustion, while the ducts 66 arranged above the burners 68 and 96 serve that function in the latter case.

With reference to FIGURE 6, a conveying carrier 114 comprising an important feature of the invention is therein shown. The carrier 114 comprises an elongated, substantially cylindrical axle 116 having an enlarged central section 118 and having a stub end 120 and drive end 122. A bevel gear 124 is suitably secured to the end 122 of each axle, as hereinafter appears. A substantially tubular main body portion 126 formed of an open mesh, metallic material suitable for cooking is mounted in concentric relation about the central section 118 by end caps 128. As best shown in FIGURE 4, the axles 116 are secured between the bearing blocks 24, 32 and 26, 34 with the stub ends rotatably journalled in the openings 28 of the blocks 32 and 34 and the ends 122 extending through the openings of the blocks 24 and 26. The bevel gears 124 of the axles are thus arranged in linear alignment, in two rows on either side of the device.

Substantially rectangular drive housings 127 are secured to the frame to cover the gears and each has an outer wall 129, end walls 130, and top and bottom walls 132, 134. An elongated shaft 136 extends through an opening in one of the end walls 130 of each housing and is rotatably mounted in a bushing 138 on the remote end wall 130 thereof. A plurality of bevel gears 140 are fixed to the shaft for rotation therewith and are drivingly engaged with the gears 124.

A depending bracket 142 on the frame structure serves as a mount for a means for powering the conveying means hereof. The power means may comprise an electric motor 144 with an output shaft 146. Drive wheels 148, 150 are mounted on the shaft and are connected to the wheels 152, 154, respectively which are carried on extensions of selected adjacent axles 116 of each row of conveying members, by belts 156, 158. As will be noted in the drawings, the relative proportions of the wheels may be varied for movement of the food through the chambers at different rates of speed.

In FIGURES 1 and 4, it is seen that the shafts 130 have emergency manual drive handles 160, used in the event of power failure.

Operation of the invention involves activation of the motor 144 to drive the shafts 136 thus rotating each of the carriers 114. Items 12 and 14 are placed on the carriers of the respective rows at the forward end of the device, and are successively transferred from carrier to carrier (the area of carrier contact against the items being varied at each transfer) and the items are therefore conveyed initially over the burners 86 and 96 with a different area being exposed to the burner heat at each transfer from one main body portion 126 to another. Due to the greater intensity of heat required in cooking meat through the grill work, the heat from the burner 86 is intensified at the point of contact by reason of the forced updraft thereof. Thereafter, the materials 12 and 14 are exposed to the overhead burners 108 and 110. Thus, the products are effectively cooked on both sides. Following this, the cooked substances are discharged to the chutes 44 and 46 which may lead to a suitable holding or warming area.

Having described and illustrated an embodiment of this invention in some detail, it will be understood that this description and illustration have been offered only by way of example, and that the invention is to be limited in scope only by the appended claims.

What is claimed is:
1. A cooking device for foods or the like, the device comprising:
    a frame having a top structure, a bottom structure, sides, and forward and rear ends;
    a conveyor mounted between the sides comprising a plurality of foraminous rollers, rotatable about fixed axes, and all of said rollers turning in the same direction of rotation;
    heat applying means mounted in the bottom structure of the frame adjacent the forward end to impart heat to the material to be cooked as it is conveyed thereover; and
    second heat applying means mounted in the top structure adjacent the rear end of the frame.
2. A device as defined in claim 1, wherein:
    the foraminous rollers are of open mesh form.
3. The invention of claim 1, and:
    heat exhaust means mounted in the top structure above the heat applying means of the bottom structure; and
    the bottom frame having opening means therein arranged beneath the second heat applying means.
4. The invention of claim 1, and:
    means connected to at least one of the frame sides for driving the rollers.
5. The invention of claim 4, wherein:
    the rollers are arranged in two rows; and
    the rollers of each row are driven at substantially the same rate within each row by a common prime mover.
6. The invention of claim 5, and:
    dual cooking chambers, each having a row of said rollers therein; and
    the dual carriers being actuated from a common energy source.

References Cited
UNITED STATES PATENTS

| 1,662,847 | 3/1928 | Cook | 99—443 |
| 2,331,707 | 10/1943 | Lotter | 99—392 X |
| 3,257,935 | 6/1966 | Temperato | 99—443 |

FOREIGN PATENTS

| 732,897 | 6/1955 | Great Britain. |

WALTER A. SCHEEL, *Primary Examiner.*

A. O. HENDERSON, *Assistant Examiner.*